B. H. SMITH & A. W. COPLEY.
ELECTRICAL PROTECTIVE DEVICE.
APPLICATION FILED AUG. 10, 1915.
1,289,288.
Patented Dec. 31, 1918.
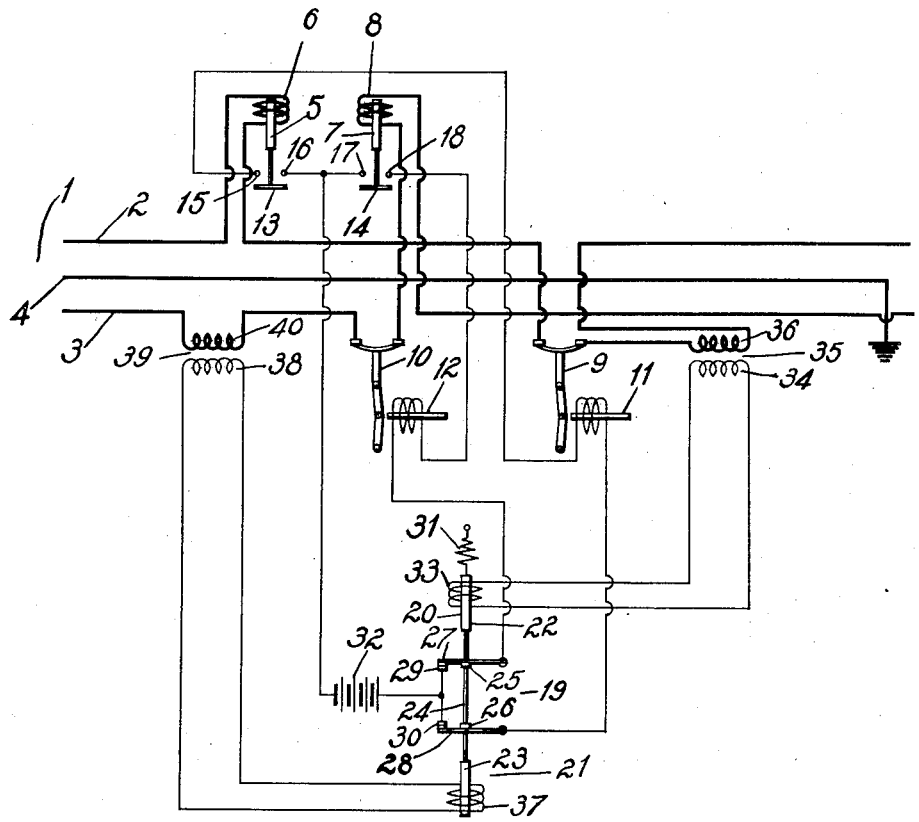

UNITED STATES PATENT OFFICE.

BENJAMIN H. SMITH, OF TURTLE CREEK, AND ALMON W. COPLEY, OF PITTSBURGH, PENNSYLVANIA, ASSIGNORS TO WESTINGHOUSE ELECTRIC AND MANUFACTURING COMPANY, A CORPORATION OF PENNSYLVANIA.

ELECTRICAL PROTECTIVE DEVICE.

1,289,288.   Specification of Letters Patent.   Patented Dec. 31, 1918.

Original application filed October 3, 1913, Serial No. 793,105. Divided and this application filed August 10, 1915. Serial No. 44,752.

*To all whom it may concern:*

Be it known that we, BENJAMIN H. SMITH, a citizen of the United States, and a resident of Turtle Creek, in the county of Allegheny and State of Pennsylvania, and ALMON W. COPLEY, a citizen of the United States, and a resident of Pittsburgh, in the county of Allegheny and State of Pennsylvania, have invented a new and useful Improvement in Electrical Protective Devices, of which the following is a specification, this application being a division of application Serial No. 793,105, filed October 3, 1913.

Our invention relates to electrical protective devices and particularly to means for insuring the proper sequence in the interruption of the various circuits of multi-circuit electrical systems.

The object of our invention is to provide means, of the above indicated character, that shall be simple in construction and connections and effective in its operation.

Our copending U. S. application, Serial No. 793,105, filed October 3, 1913, and assigned to the Westinghouse Electric and Manufacturing Company, of which this application is a division, discloses a normally balanced relay that comprises two oppositely connected windings for operating a single movable member to control the operation of a plurality of contact members. Frequently, in multi-circuit electrical systems, it is desirable to interrupt the circuit having the largest overload or the largest load when the loads on the two circuits are unbalanced. We provide an arrangement whereby the relay disclosed in the above-indicated application is utilized for the purpose of preventing the interruption of the circuits except in their correct sequence.

The single figure of the accompanying drawing is a diagrammatic view of an electrical circuit which embodies our invention.

A single-phase alternating-current circuit 1 comprises two main conductors 2 and 3 and a grounded neutral conductor 4. The winding 6 of an overload relay 5 is connected in series relation to the conductor 2, and the winding 8 of an overload relay 7 is connected in series relation to the conductor 3. The conductor 2 is provided with a circuit interrupter 9, and the conductor 3 is provided with a circuit interrupter 10 so that each circuit may be interrupted independently. The circuit interrupters 9 and 10 are provided with tripping electro-magnets 11 and 12, respectively. The relays 5 and 7 are provided with movable contact members 13 and 14 that are adapted to engage stationary contact members 15 and 16, and 17 and 18, respectively.

A relay 19, comprising two oppositely disposed electromagnets 20 and 21, is provided for the purpose of controlling the circuits of the windings of the tripping electromagnets 11 and 12. The movable core members 22 and 23 of the electromagnets 20 and 21 are operatively connected together by a rod 24 having two collars 25 and 26 mounted thereon. Two resiliently mounted contact members 27 and 28 are so disposed that, when the movable core members 22 and 23 are in their mid positions, they engage stationary contact members 29 and 30 and also the collars 25 and 26, respectively. The movable core members are restrained in the mid position by a spring 31.

The stationary contact members 16 and 17 of the relays 5 and 7 are connected to one terminal of a source of electromotive force 32, the other terminal of which is connected to the stationary contact members 29 and 30. The contact member 27 of the relay 19 is connected to one terminal of the winding of the tripping electromagnet 12, the other terminal of which is connected to the stationary contact member 18 of the relay 7. The contact member 28 of the relay 19 is connected to one terminal of the winding of the tripping electro-magnet 11, and the other terminal of the winding of the tripping electromagnet 11 is connected to the stationary contact member 15 of the relay 5. The winding 33 of the relay 20 is connected to the secondary winding 34 of a transformer 35, the primary winding 36 of which is connected in circuit with the conductor 2, and the winding 37 of the relay 21 is connected in circuit with the secondary winding 38 of a transformer 39, the primary winding 40 of which is connected in circuit with the conductor 3.

Assuming that an unbalanced overload occurs upon the circuit, and that the larger current traverses the conductor 2, the relays 5 and 7 will be actuated, if the overload is of a predetermined value, to thereby cause engagement of the contact members 13, 15 and 16, and 14, 17 and 18, but, at the instant this engagement is effected, the movable core member 22 of the relay 19 will move upwardly to effect a disengagement of the contact members 27 and 29, thus open-circuiting the winding of the tripping electromagnet 12. Current traverses the winding of the tripping electromagnet 11 only and permits the circuit of the conductor 2 to be interrupted, thus disconnecting the circuit having the greater overload. After the conductor 2 has been interrupted, the movable core members 23 of the relay 19 will move downwardly because current now traverses the winding 37 only to thus disengage the contact members 28 and 30. At the same time that the contact members 28 and 30 are disengaged, the contact members 27 and 29 are engaged, and the circuit through the winding of the tripping electromagnet 12 is completed to thus cause the circuit interrupter 10 to be tripped.

It will be understood that our invention is provided for the purpose of automatically interrupting the conductor that carries the greater portion of an unbalanced load and is not limited to single-phase grounded neutral systems, as it is equally applicable to any multi-circuit system. We wish it to be further understood that our invention is not limited to the specific relays illustrated, as many modifications may be made without departing from the spirit and scope of the invention as set forth in the appended claims.

We claim as our invention:

1. In a two-circuit electric system, the combination with two circuit interrupters and two strip coils therefor, of a normally open and a normally closed switch for each trip coil, means for closing the normally open switches when an overload traverses the system, and means for opening one of the normally closed switches when relatively more current traverses one circuit than the other.

2. In a two-circuit electric system, the combination with two circuit interrupters and two trip coils therefor, of a normally open and a normally closed switch for each trip coil, current-responsive relays for closing the normally open switches when an overload traverses the system, and a normally balanced relay for opening the normally closed switches in a predetermined sequence.

3. In a multi-circuit electric system, the combination with a circuit interrupter and a trip coil for each circuit, of a normally open and a normally closed switch for each trip coil, means for closing the normally open switch when a predetermined current traverses the system, and means for opening the other switch under predetermined relative conditions in the various circuits.

4. In a multi-circuit electric system, the combination with circuit interrupters having trip coils, of two switches for controlling the circuit of each trip coil, overload relays for closing one switch of each trip coil under predetermined conditions, and a differential relay for selectively opening the other switches when the circuits become unbalanced.

5. In a multi-circuit electric system, the combination with circuit interrupters having trip coils, of two switches for controlling the circuit of each trip coil, overload relays for closing one switch of each trip coil under predetermined conditions, and a differential relay for selectively opening the other switches under predetermined conditions.

6. In a two-circuit electric system, the combination with circuit interrupters having trip coils, of two switches for each trip coil, means for closing one switch of each trip coil when the current traversing the system exceeds a predetermined value, and means for selectively opening the other switches to cause the interrupters to be tripped in sequence.

7. In a two-circuit electric system, the combination with circuit interrupters having trip coils, of a normally open switch and a normally closed switch for each trip coil, means for closing the normally open switch when equal overloads traverse the two circuits, and means for selectively opening the normally closed switches when unequal overloads traverse the two circuits to cause the circuit that is traversed by the larger overload to be interrupted before the other circuit.

8. In a two-circuit electric system, the combination with circuit interrupters having trip coils, of a normally open switch and a normally closed switch for each trip coil, means for closing the normally open switches to trip the interrupters when equal overloads traverse the circuits, and means responsive to the difference in currents traversing the two circuits for selectively opening and closing the normally closed switches to cause the circuit that is traversed by the larger overload to be interrupted first.

9. In a multi-circuit electric system, the combination with circuit interrupters and electromagnetic means for tripping the same, of two switches for each of said means, means for closing one switch of each of said electromagnetic means when the current traversing the system exceeds a predetermined value, and means for selectively opening the other switches.

10. In a multi-circuit electric system, the combination with circuit interrupters and trip coils therefor, of two switches for each of said trip coils, overload-responsive means for closing one switch of each trip coil under predetermined conditions, and means responsive to the ratio of the currents traversing the different circuits for selectively opening the other switches.

In testimony whereof, we have hereunto subscribed our names this 2nd day of August, 1915.

BENJAMIN H. SMITH.
ALMON W. COPLEY.